US009707987B2

(12) United States Patent
Hanson et al.

(10) Patent No.: US 9,707,987 B2
(45) Date of Patent: Jul. 18, 2017

(54) STROLLER WITH WHEEL SWIVEL MECHANISM

(71) Applicant: Helen of Troy Limited, Belleville, St. Michael (BB)

(72) Inventors: Thomas C. Hanson, New York, NY (US); Tiffany C. Chen, New York, NY (US); Troy H. Phipps, Brooklyn, NY (US); Wei Dong, Jiangsu (CN); Xiaocong Gu, Jiangsu (CN)

(73) Assignee: Helen of Troy Limited, Belleville, St. Michael (BB)

( * ) Notice: Subject to any disclaimer, the term of this patent is extended or adjusted under 35 U.S.C. 154(b) by 2 days.

(21) Appl. No.: 15/098,698

(22) Filed: Apr. 14, 2016

(65) Prior Publication Data

US 2017/0066465 A1 Mar. 9, 2017

Related U.S. Application Data

(63) Continuation-in-part of application No. 14/874,772, filed on Oct. 5, 2015.

(30) Foreign Application Priority Data

Sep. 6, 2015 (CN) .......................... 2015 1 0557786

(51) Int. Cl.
*B60B 33/02* (2006.01)
*B62B 7/06* (2006.01)
*B62B 9/08* (2006.01)

(52) U.S. Cl.
CPC ................ *B62B 7/06* (2013.01); *B60B 33/02* (2013.01); *B62B 9/082* (2013.01); *B62B 2205/06* (2013.01); *B62B 2301/04* (2013.01)

(58) Field of Classification Search
CPC ........... B60B 33/026; B62B 7/06; B62B 7/08; B62B 7/10
See application file for complete search history.

(56) References Cited

U.S. PATENT DOCUMENTS 5,125,676 A * 6/1992 Teng ....................... B60B 33/00
16/35 R
6,682,090 B2 1/2004 Chen
(Continued)

FOREIGN PATENT DOCUMENTS

| CN | 203142743 | 8/2013 |
| CN | 203581046 | 5/2014 |
| GB | 2 351 474 | 9/2002 |

OTHER PUBLICATIONS

International Search Report filed in PCT/US2016/047952 mailed Nov. 7, 2016.

*Primary Examiner* — Emma K Frick
(74) *Attorney, Agent, or Firm* — Rankin, Hill & Clark LLP

(57) ABSTRACT

A collapsible stroller includes a stroller frame, at least one hinge mechanism, a wheel, and a swivel mechanism. The stroller frame is moveable between a deployed position and a collapsed position. The hinge mechanism allows for movement of the stroller frame between the collapsed position and the deployed position. The swivel mechanism connects the wheel to the stroller frame. The swivel mechanism includes a vertical axle, a cam follower, and a cam. The vertical axle connects with the wheel and is rotatable with respect to the stroller frame about a vertical axis. The cam follower is fixed to the vertical axle. The cam includes a sloped cam surface at least partially surrounding the vertical axle. The sloped cam surface contacts the cam follower to move the cam follower along the sloped cam surface, which results in rotation of the vertical axle about the vertical axis.

8 Claims, 8 Drawing Sheets

(56) References Cited

U.S. PATENT DOCUMENTS

| | | | |
|---|---|---|---|
| 6,779,804 B1 * | 8/2004 | Liu | B60B 1/006 16/35 R |
| 6,964,083 B2 * | 11/2005 | Nagai | B60B 1/006 16/35 R |
| 7,083,175 B1 * | 8/2006 | Liu | B60B 1/006 16/35 R |
| 7,213,818 B2 * | 5/2007 | Chang | B60B 33/026 16/35 R |
| 7,258,353 B2 * | 8/2007 | Liao | B62B 9/00 16/19 |
| 7,506,890 B2 * | 3/2009 | Chen | B60B 33/001 280/47.38 |
| 7,621,003 B2 * | 11/2009 | Myers | A61G 1/0293 16/35 R |
| 7,922,182 B2 * | 4/2011 | Van der Vegt | B62B 7/068 188/20 |
| 8,061,732 B2 | 11/2011 | Song | |
| 8,205,907 B2 | 6/2012 | Chicca | |
| 8,448,976 B2 * | 5/2013 | Funakura | B62B 9/20 280/642 |
| 8,484,802 B1 * | 7/2013 | Lin | B60B 33/0086 16/35 R |
| 8,602,444 B2 * | 12/2013 | Chang | B62B 1/12 280/651 |
| 8,991,854 B2 * | 3/2015 | Greger | B62B 7/08 280/650 |
| 9,044,656 B2 * | 6/2015 | Zhang | B62B 3/12 |
| 9,233,704 B2 * | 1/2016 | Wu | B62B 7/083 |
| 9,283,977 B2 * | 3/2016 | Wu | B62B 7/006 |
| 9,346,478 B2 * | 5/2016 | Kimberley | B62B 5/0433 |
| 2003/0204933 A1 * | 11/2003 | Yeh | B60B 33/0005 16/35 R |
| 2005/0140105 A1 * | 6/2005 | Hernandez | B60B 1/006 280/62 |
| 2006/0103114 A1 * | 5/2006 | Huang | B60B 1/006 280/642 |
| 2012/0126512 A1 | 5/2012 | Kane | |
| 2012/0326418 A1 * | 12/2012 | Ohnishi | B62B 7/066 280/642 |
| 2014/0327233 A1 | 11/2014 | Greger et al. | |
| 2015/0224823 A1 * | 8/2015 | Turturro | A61G 7/05 5/510 |
| 2016/0059628 A1 * | 3/2016 | Degrace | B60B 33/0068 16/35 R |

* cited by examiner

STROLLER WITH WHEEL SWIVEL MECHANISM

BACKGROUND

The present disclosure is generally related to collapsible strollers. Many strollers collapse, i.e., move between a deployed position and a collapsed position, by folding about a hinge mechanism connecting a handle of the stroller to a leg of the stroller.

A known collapsible stroller includes a swivel mechanism for rotating front wheels of the stroller when moving from the deployed position to the collapsed position. The swivel mechanism allows for a more compact configuration when the stroller is in the collapsed position. The known swivel mechanism includes a spring-loaded plunger that interacts with a cam to orient the direction of the front wheel to a desired angular position. A pull link connects the plunger with a slider. The pull link is tensioned when the stroller is in the deployed position. Folding the stroller moves the slider, which allows the pull link to release tension on the plunger so that the pull link interacts with the cam forcing the front wheel to the desired compact position.

SUMMARY

In view of the foregoing, a collapsible stroller includes a stroller frame, at least one hinge mechanism on the stroller frame, a wheel, and a swivel mechanism connecting the wheel to the stroller frame. The stroller frame is moveable between a deployed position and a collapsed position. The at least one hinge mechanism on the stroller frame allows for movement of the stroller frame between the collapsed position and the deployed position. The swivel mechanism connects the wheel to the stroller frame. The swivel mechanism includes a vertical axle, a cam follower, and a cam. The vertical axle connects with the wheel for rotation with the wheel and is rotatable with respect to the stroller frame about a vertical axis. The cam follower is fixed to the vertical axle so as to be moveable with the vertical axle. The cam includes a sloped cam surface at least partially surrounding the vertical axle. The sloped cam surface contacts the cam follower to move the cam follower along the sloped cam surface, which results in rotation of the vertical axle about the vertical axis.

DETAILED DESCRIPTION

Figure 1:
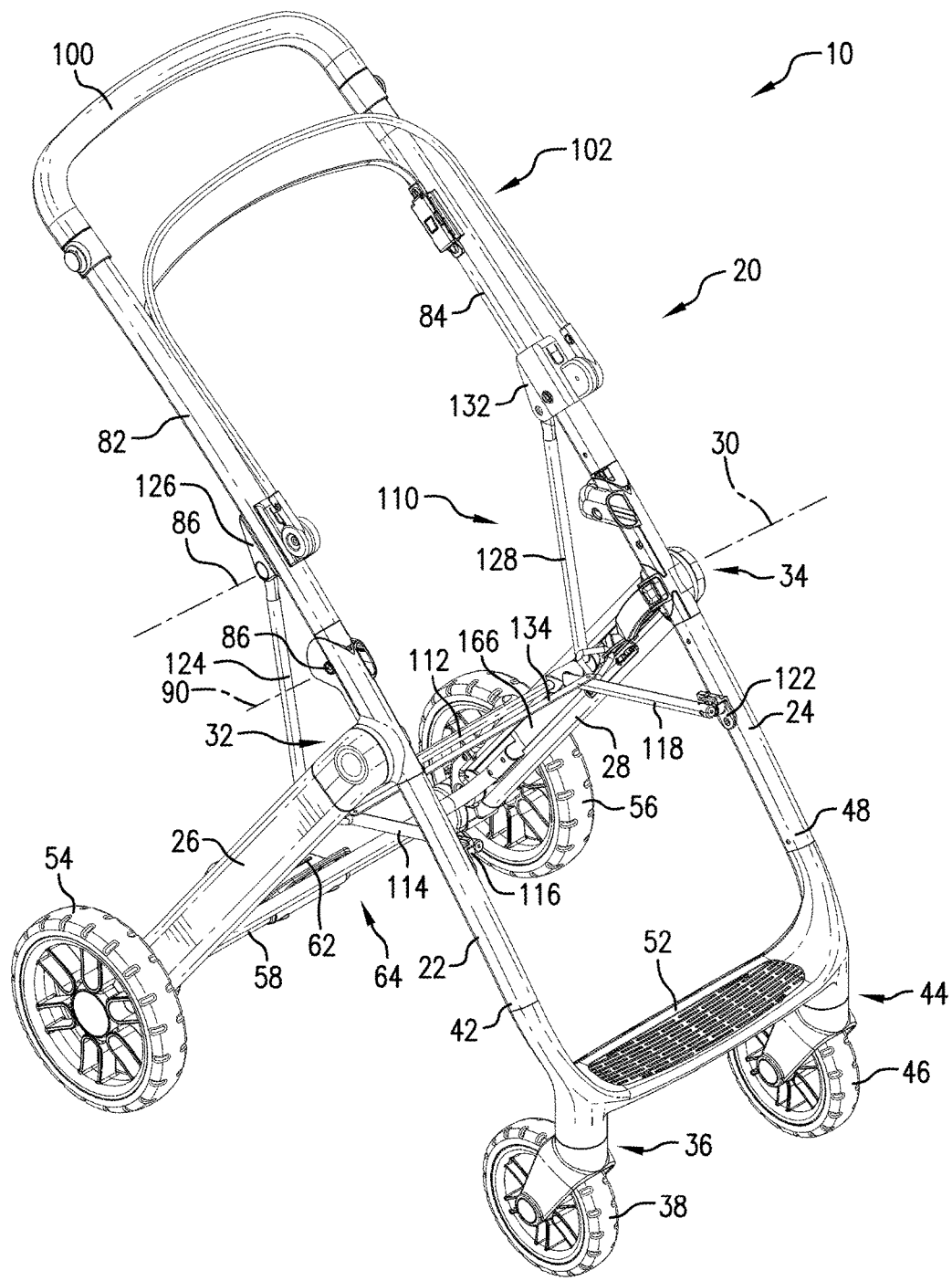
FIG. 1 is a front perspective view of a stroller frame in a deployed position.
Figure 2:
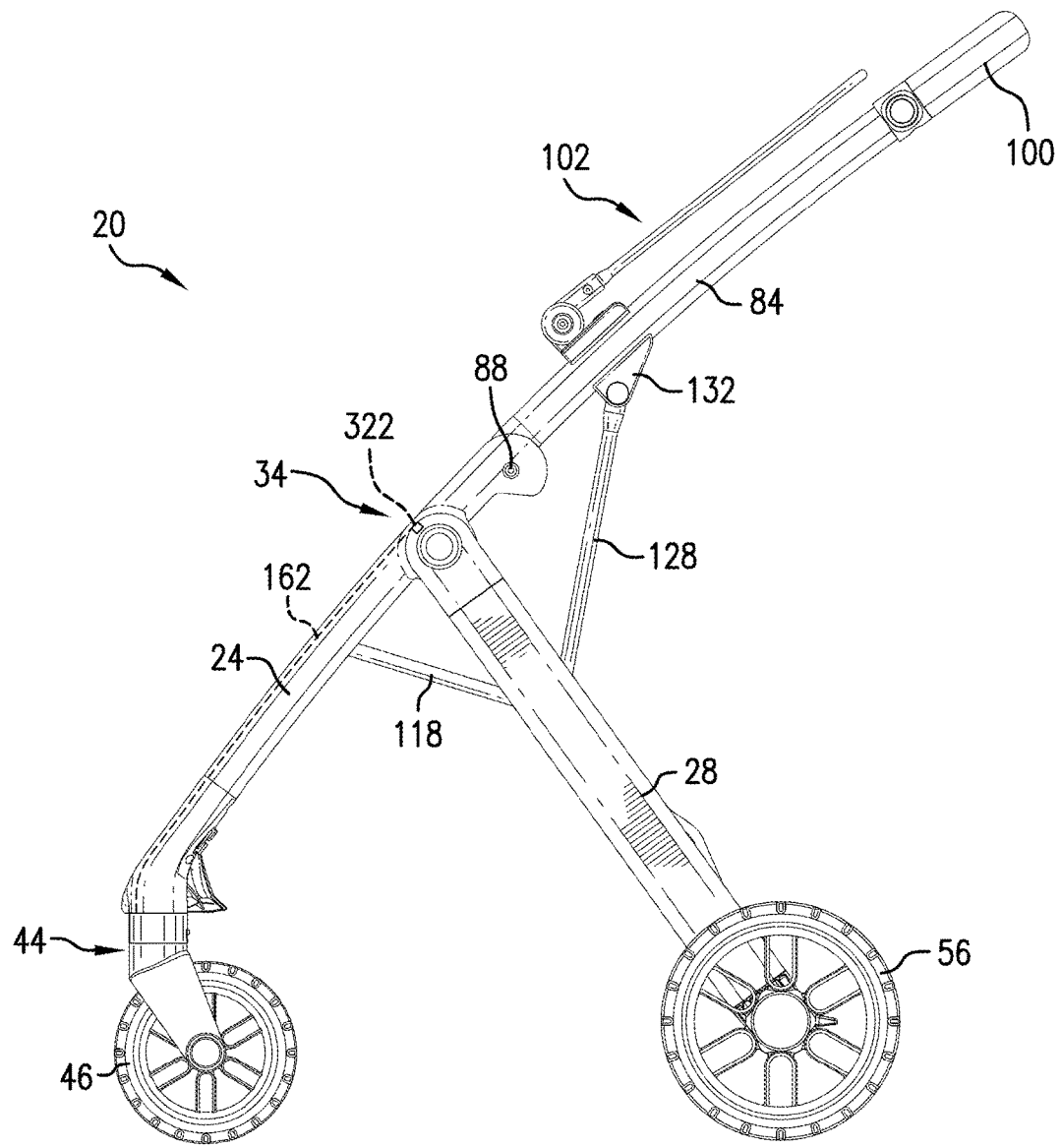
FIG. 2 is a side elevation view of the stroller frame in the deployed position.
Figure 3:
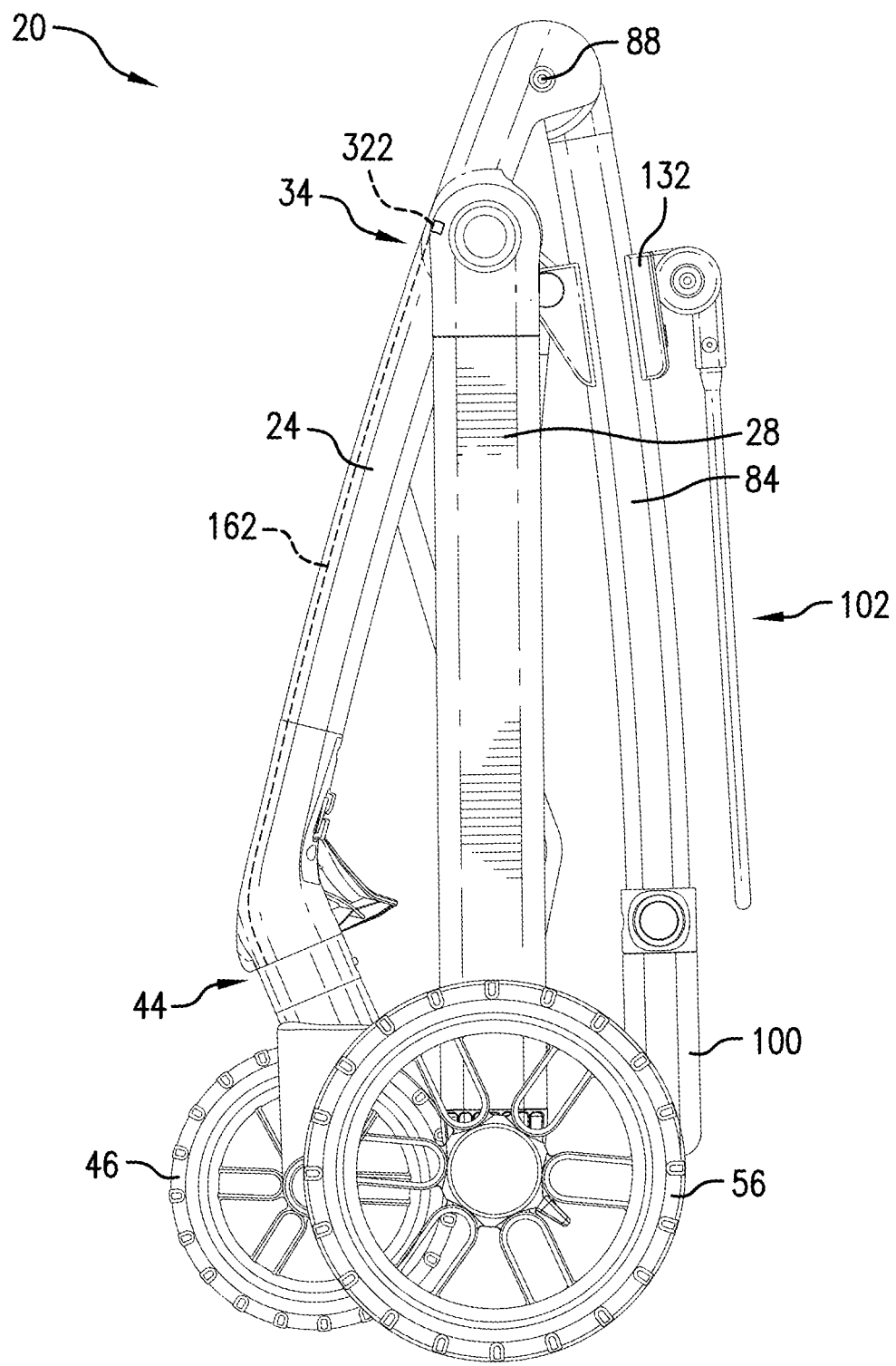
FIG. 3 is a side elevation view of the stroller frame in a collapsed position.
Figure 4:
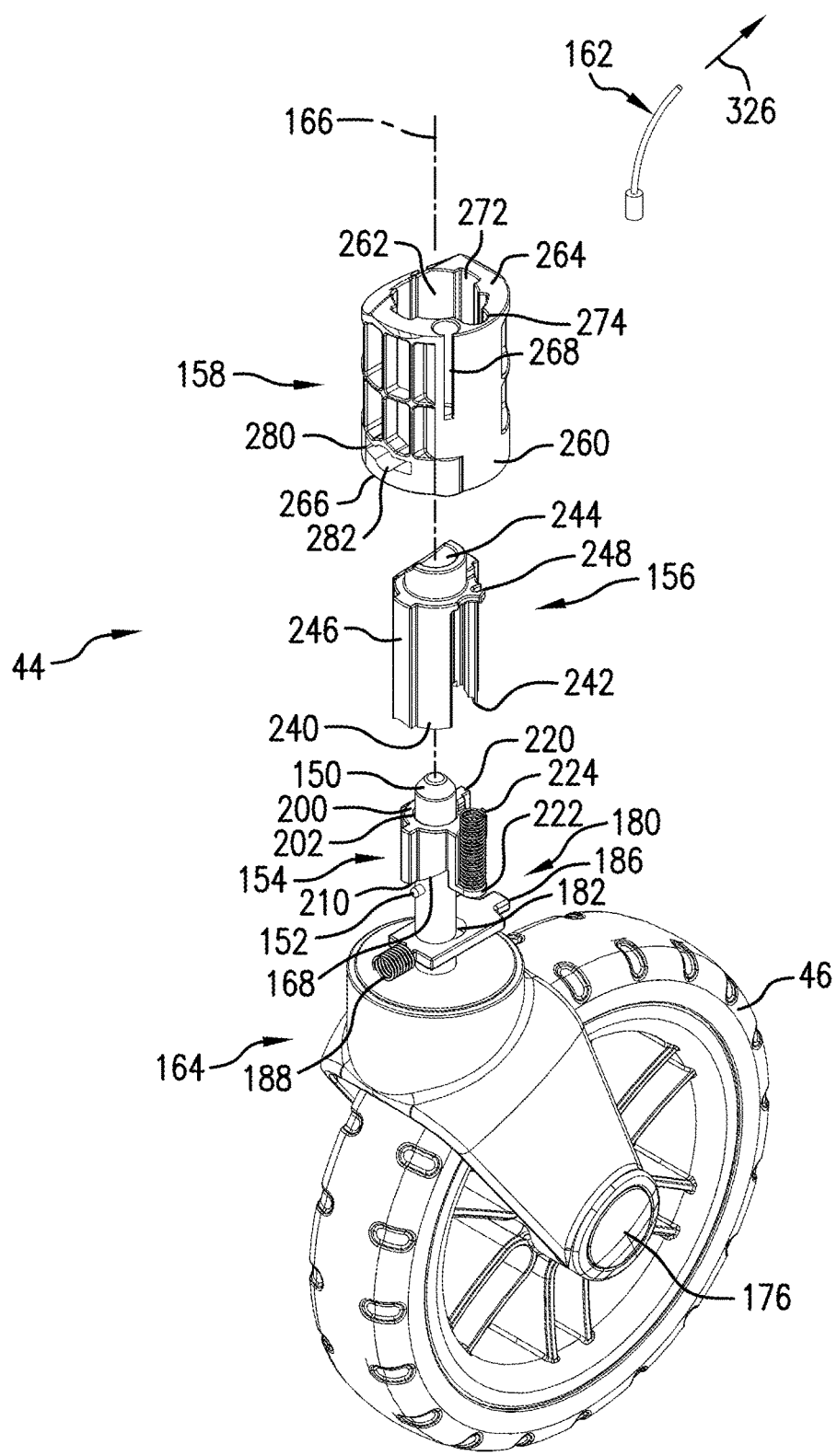
FIG. 4 is an exploded perspective view of components of a swivel mechanism and a front wheel of a stroller having the stroller frame depicted in FIG.

With reference to FIG. 1, a stroller 10 includes soft goods that can include a seat (not shown), a canopy (not shown) and a basket (not shown). The stroller 10 further includes a stroller frame 20 that supports the soft goods. The soft goods can vary considerably in configuration and are not shown in detail to provide more clarity to the drawings. The stroller frame 20 (as well as the stroller 10) is moveable between a deployed position, which is shown in FIGS. 1 and 2, and a collapsed position, which is shown in FIG. 3.

The stroller frame 20 includes a front right leg 22 and a front left leg 24. The stroller frame 20 also includes a rear right leg 26 and a rear left leg 28. The front legs 22, 24 can pivot with respect to the rear legs 26, 28 about a leg collapse axis 30. The front right leg 22 connects with the rear right leg 26 at a right hinge mechanism 32. The front left leg 24 and the rear left leg 28 connect at a left hinge mechanism 34. The hinge mechanisms 32, 34 on the stroller frame 20 allow for movement of the stroller frame 20 between the collapsed position (shown in FIG. 3) and the deployed position (shown in FIGS. 1 and 2).

A right swivel mechanism 36 connects a front right wheel 38 to the stroller frame 20 adjacent a lower end 42 of the front right leg 22. Similarly, a left swivel mechanism 44 connects a front left wheel 46 to the stroller frame 20 adjacent a lower end 48 of the front left leg 24. A foot rest 52 attaches to the lower end 42 of the front right leg 22 and to the lower end 48 of the front left leg 24.

A rear right wheel 54 connects with the rear right leg 26 at an end opposite the right hinge mechanism 32. A rear left wheel 56 connects with the rear left leg 28 at an end opposite the left hinge mechanism 34. A rear transverse support 58 connects the rear right wheel 54 and the rear left wheel 56. An actuator pedal 62 can be provided on the rear transverse support 58 to actuate a break mechanism (not shown in detail in FIG. 1), which can be conventional, to prevent the rear wheels 54, 56 from rolling. A basket support frame assembly 64 can connect with the rear legs 26, 28 and provide support for a basket, which is part of the aforementioned soft goods.

A right handle support member 82 connects with the front right leg 22 and is pivotable with respect to the front right leg 22 between an upright position, which is shown in FIG. 1, and a folded position, which is shown in FIG. 3. A left handle support member 84 connects with the front left leg 24 and is also pivotable with respect to the front left leg 24 between the upright position and the folded position. Axles 86, 88 (see also FIG. 2) connect the right handle support member 82 with the front right leg 22 and the left handle support member 84 with the front left leg 24, respectively. The axles 86, 88 are centered along a handle collapse axis 90. A handle 100, which is used to maneuver the stroller 10, connects with the handle support members 82, 84. A canopy support frame assembly 102 also connects with the handle support members 82, 84. The canopy support frame assembly 102 is provided to support the canopy, which is also part of the aforementioned soft goods.

A seat frame assembly 110 also connects with the stroller frame 20. The seat frame assembly 110 includes a main transverse support member 112 that connects with the rear right leg 26 and the rear left leg 28. A front right support member 114 connects with the main transverse support member 112 and the front right leg 22. A front right bracket 116 is provided to connect the front right support member 114 with the front right leg 22. A front left support member 118 connects the main transverse support member 112 with the front left leg 24 through a front left bracket 122. A rear right support member 124 connects the main transverse support member 112 with the right handle support member 82. A rear right bracket 126 is provided to connect the rear right support member 124 with the right handle support member 82. A rear left support member 128 connects with the main transverse support member 112 and with the left handle support member 84 through a rear left bracket 132. A secondary transverse support member 134 connects the front right support member 114 with the front left support member 118.

The stroller 10 further includes a hinge lock mechanism, which is hidden from view by the rear right leg 26, capable of a locked state and an unlocked state. In the locked state, the hinge lock mechanism locks the hinge mechanisms 32, 34 to maintain the stroller frame 20 in the deployed position. While in the locked state, the hinge lock mechanism also precludes pivotal movement of the handle support members 82, 84 with respect to the front legs 22, 24. In the unlocked state, the hinge lock mechanism allows the stroller frame 20 to move from the deployed position toward the collapsed position.

FIGS. 4-8 depict the left swivel mechanism 44 in detail. The right swivel mechanism 36 includes similar components. As such, the left swivel mechanism 44 will be described with particularity with the understanding that the right swivel mechanism 36 includes the same components.

The left swivel mechanism 44 includes a vertical axle 150, a cam follower 152, and a cam 154. The left swivel mechanism 44 also includes a cam housing 156, a swivel mechanism housing 158, and an actuator 162. The vertical axle 150 connects with the front left wheel 46 through a front left wheel mount 164 for rotation with the front left wheel 46. The vertical axle 150 is rotatable with respect to the stroller frame 20 about a vertical axis 166. When the vertical axle 150 rotates about the vertical axis 166, the front left wheel 46 rotates, or swivels, about the vertical axis 166. The cam follower 152 is fixed to the vertical axle 150 so as to be moveable with the vertical axle 150. As illustrated, the cam follower 152 is a pin fastened (e.g., welded) to the vertical axle 150. The cam follower 152 extends radially outward form the vertical axle 150. The cam 154 includes a sloped cam surface 168 at least partially surrounding the vertical axle 150. The sloped cam surface 168 is located above the cam follower 152. When the cam 154 moves with respect to the vertical axle 150, the sloped cam surface 168 contacts the cam follower 152 to move the cam follower 152 along the sloped cam surface 168, which results in rotation of the vertical axle 150 about the vertical axis 166.

The vertical axle 150 extends upwardly from the front left wheel mount 164. As more clearly seen in FIG. 5, the vertical axle 150 includes an annular notch 170. The vertical axle 150 is fixed to the front left wheel mount 164 so that rotation of the vertical axle 150 about the vertical axis 166 results in a swiveling movement of the front left wheel mount 164 and the front left wheel 46 about the vertical axis 166.

The front left wheel mount 164 includes a hub section 172, a forked section 174 that depends downwardly from the hub section 172, and a wheel axle 176 that is received in an opening (not visible) in the front left wheel 46. The front left wheel 46 rotates on the wheel axle 176.

A clip 180 is provided to connect the front left wheel 46 with the stroller frame 20. The clip 180 cooperates with the swivel mechanism housing 158 to retain the front left wheel 46 so that the front left wheel 46 does not move in a direction parallel with the vertical axis 166. The clip 180 includes an opening 182 through which the vertical axle 150 extends. The clip 180 further includes a spring tab 184 and a connector tab 186 diametrically opposed from the spring tab 184. A clip—biasing spring 188 is received on the spring tab 184 and biases the clip 180 so that the clip 180 contacts the vertical axle 150 in the annular notch 170. The connector tab 186 engages the swivel mechanism housing 158 to connect the front left wheel 46 with the swivel mechanism housing 158.

The cam 154 includes a cylindrical body 200 that defines a bore 202 that receives the vertical axle 150. The cylindrical body 200 also includes the sloped cam surface 168 at a lower end. The cam 154 moves with respect to the vertical axle 150 between a first operating position when the stroller frame 20 is in the deployed position and a second operating position when the stroller frame 20 is in the collapsed position. The cam 154 is moveable between the first operating position and the second operating position in a direction parallel with the vertical axis 166 with respect to the vertical axle 150, the cam housing 156, and the swivel mechanism housing 158. When the cam 154 is in the first operating position, the cam follower 152 is aligned with or in contact with a lowest location 210 (FIG. 4) on the sloped cam surface 168. The cam follower 152 also can be located below the lowest location 210 when the cam 154 is in the first operation position and becomes in contact with the lowest position 210 as the cam 154 moves vertically down the vertical axle 150 from the first operation position. When the cam 154 is in the second operating position, the cam 154 has moved vertically down the vertical axle 150 from the first operating position and the cam follower 152 is in contact with an uppermost location 212 (FIG. 5) on the sloped cam surface 168. As the cam 154 moves in a direction parallel with the vertical axis 166 on the vertical axle 150, the cam follower 152, while in contact with the sloped cam surface 168, moves along the sloped cam surface 168 between the lowest location 210 and the uppermost location 212. The results in the vertical axle 150 and the front left wheel 46 swiveling about the vertical axis 166.

The cam 154 is prohibited from rotating about the vertical axis 166 with respect to the cam housing 156. The cam 154 includes a wing (three wings 220 are provided in the illustrated embodiment). Each wing 220 extends radially away from the cylindrical body 200. Each wing 220 cooperates with the cam housing 156 to prohibit rotation of the cam 154 with respect to the cam housing 156 about the vertical axis 166. The cam 154 also includes a ledge 222 that extends away from the cylindrical body 200. A cam—biasing spring 224 acts against the ledge 222 to apply a biasing (downward) force to the cam 154 biasing the cam 154 toward the second operating position. With reference back to FIG. 5, the cam 154 also includes an actuator connector 226 which in the illustrated embodiment is a notch for connecting with the actuator 162.

The cam housing 156 is hollow to receive the cam 154. The cam housing 156 includes a cylindrical wall 240 having an elongate vertical slot 242 to accommodate movement of the ledge 222 of the cam 154. The cam housing 156 also includes an upper opening 244 through which the vertical axle 150 extends. The cam housing 156 also includes a wing extension (three wing extensions 246 are provided in the illustrated embodiment). Each wing extension 246 receives a respective wing 220 on the cam 154, which prohibits rotation of the cam 154 with respect to the cam housing 156.

The cam 154, however, can move in a direction parallel with the vertical axis 166 with each wing 220 received in a respective wing extension 246. The cam housing 156 further includes an actuator guide 248, which is aligned with the actuator connector 226 on the cam 154. The actuator 162 extends through the actuator guide 248.

The swivel mechanism housing 158 receives the cam housing 156. The cam housing 156 is prohibited from rotating about the vertical axis 166 with respect to the swivel mechanism housing 158. The swivel mechanism housing 158 in the illustrated embodiment is a generally tubular body 260 having a central passage 262 for receiving the cam housing 156. The swivel mechanism housing 158 includes an upper end 264 and a lower end 266. The central passage 262 extends from the upper end 264 to the lower end 266 and is generally aligned with the vertical axis 166. The lower end 266 contacts the hub section 172 of the front left wheel mount 164. The swivel mechanism housing 158 also includes an actuator notch 268 that extends from the upper end 264 toward the lower end 266 in a direction generally parallel with the vertical axis 166. The actuator 162 is received in and can move within the actuator notch 268. The actuator notch 268 is also aligned with the actuator guide 248 on the cam housing 156 and the actuator connector 226 on the cam 154. The swivel mechanism housing 158 also include wing pockets 272 that extend outwardly from the central passage 262. Each wing pocket 272 receives a respective wing extension 246 on the cam housing 156. The swivel mechanism housing 158 also includes a spring pocket 274 that extends outwardly from the central passage 262 and receives the cam—biasing spring 224.

Figure 6:
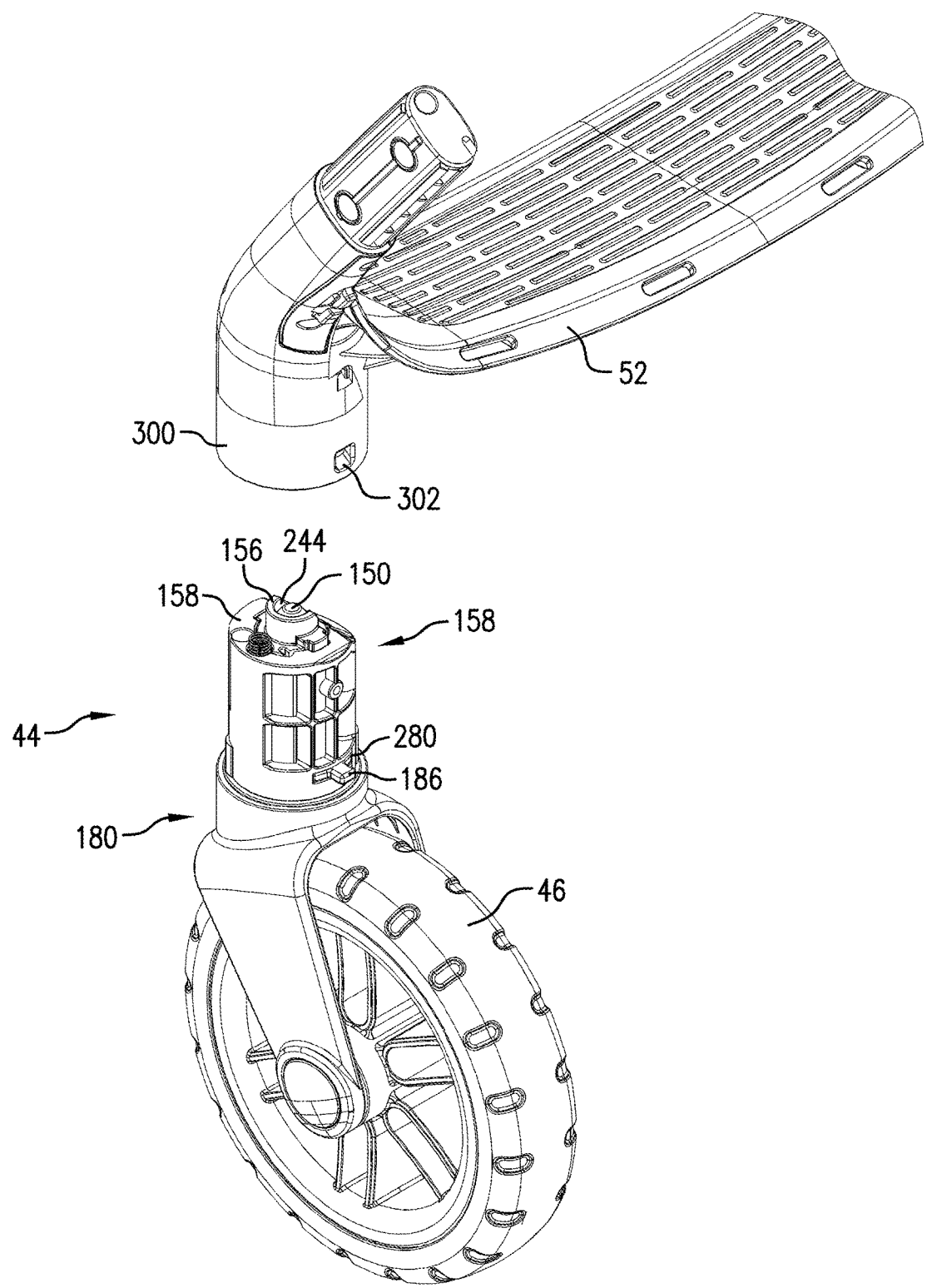
FIG. 6 is an exploded view of the front wheel and swivel mechanism removed from a foot rest of the stroller frame depicted in FIG. 1.

A clip slot 280 extends through the tubular body 260 of the swivel mechanism housing 158 to receive the clip 180 for attaching the front left wheel 46 with the swivel mechanism housing 158. As seen in FIG. 6, the connector tab 186 extends through one side of the clip slot 280. The clip slot 280 further includes a rounded section 282 for receiving the clip—biasing spring 188.

Figure 7:
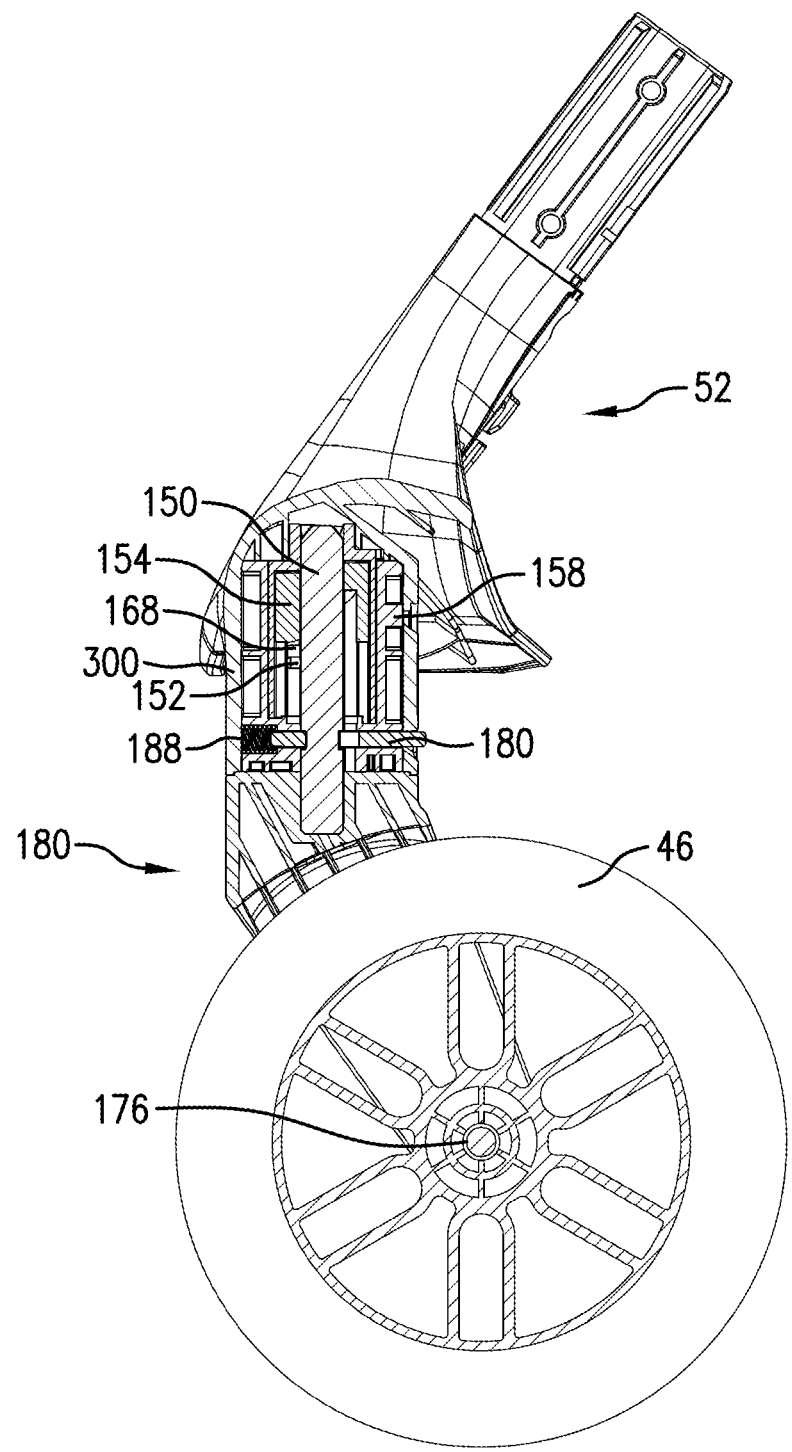
FIG. 7 is a cross-sectional view taken through the front wheel and the swivel mechanism.

With reference to FIG. 6, the foot rest 52 includes a swivel mechanism socket 300, which is hollow. The swivel mechanism housing 158 is received in the swivel mechanism socket 300. The swivel mechanism socket 300 also includes a clip opening 302 through which the connector tab 186 on the clip 180 extends to connect the front left wheel 46 with the foot rest 52. As seen in FIG. 7, the clip—biasing spring 188 contacts the swivel mechanism socket 300 to bias the clip 180 into engagement with the vertical axle 150 to maintain the vertical axle within the swivel mechanism housing 158 and the swivel mechanism socket 300. The swivel mechanism housing 158 is prohibited from rotating about the vertical axis 166 with respect to foot rest 52. Rotation of the vertical axle 150 about the vertical axis 166 is not prohibited by the clip 180.

The left swivel mechanism 44 further includes the actuator 162 for controlling movement of the cam 154. The actuator 162 in the illustrated embodiment is a cable. The actuator 162 is operatively connected with the stroller frame 20 or the left hinge mechanism 34. With reference to FIGS. 2 and 3, the actuator connects at a connection location 322 on the front left leg 24. As the front left leg 24 pivots with respect to the rear left leg 28, the connection location 322 moves on the left hinge mechanism 34 so that the actuator 162, which is a cable in this instance, is pulled tight when the stroller frame 20 is in the deployed position, and tension is released from the actuator 162 when the stroller frame 20 is in the collapsed position.

Figure 8:
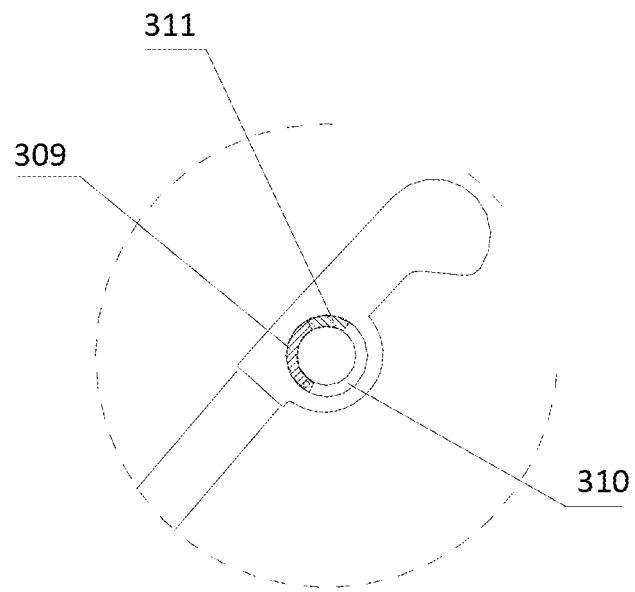
FIG. 8 is a side view of a pulling slider and a driving slider.

With reference to FIG. 8, in another embodiment, the left swivel mechanism 44 further includes a pulling slider 309, a driving slider 311, and a directing channel 310. The actuator 162 is connected to the pulling slider 309 that slidably moves in the directing channel 310 that is placed on the front left leg 24. The driving slider 311 is located on the rear left leg 28 and is configured to be inserted into the directing channel 310 to slidably move in the directing channel 310. As the stroller frame 20 moves to the deployed position, the rear left leg 28 pivots with respect to the front left leg 24 so that the driving slider 311 moves along the directing channel 310 towards the pulling slider 309 and drives the pulling slider 309 to pull the actuator 162 tight. As the stroller frame 20 moves to the collapsed position, the rear left leg 28 pivots with respect to the front left leg 24 so that the driving slider 311 moves along the directing channel 310 away from the pulling slider 309, resulting in that the pulling slider 309 is not driven and tension is released from the actuator 162. As seen in FIG. 8, the directing channel 310 is a circular sliding channel rotating around the leg collapse axis 30. When viewed from a cross-section plane orthogonal to the leg collapse axis 30, the pulling slider 309 and the driving slider 311 are both arc-shaped and cooperatively displaced in the circular sliding channel of the directing channel 310.

Figure 5:
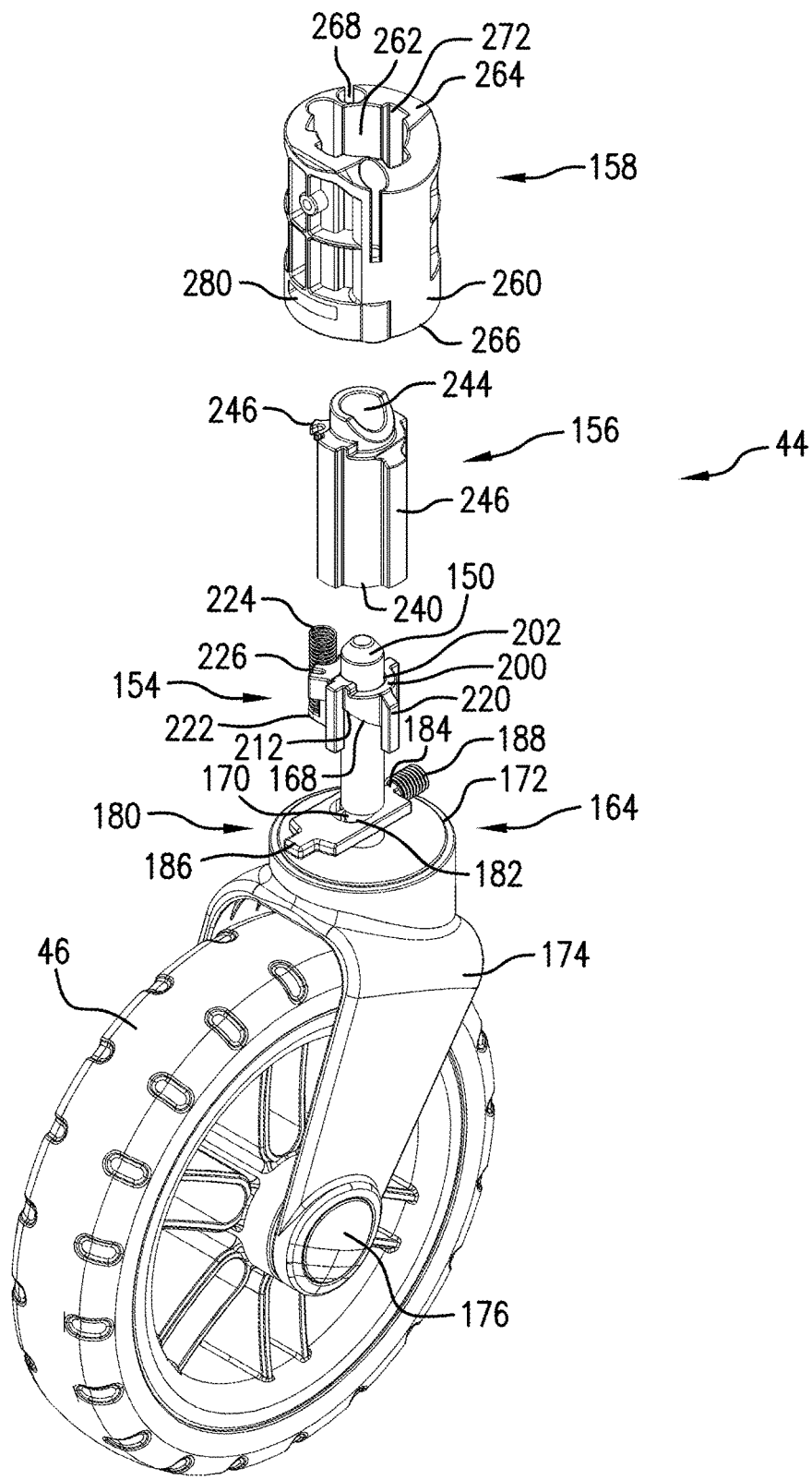
FIG. 5 is an exploded view of the swivel mechanism and front wheel shown in FIG. 4 from a perspective opposite to that shown in FIG. 4.

The particular mechanism by which the tightening and loosening of the actuator 162 is provided is shown schematically because a number of different mechanisms could be used. The actuator 162 pulls (applies a force) on the cam 154 to move the cam 154 as the stroller frame 20 is moved from the collapsed position (FIG. 3) toward the deployed position (FIG. 2). As mentioned above, the cam 154 is moveable with respect to the vertical axis 166 between the first operating position and the second operating position. The cam—biasing spring 224 applies a biasing force to the cam 154 by acting against a surface in the swivel mechanism socket 300 to bias the cam 154 in a downward direction parallel with the vertical axis 166 per the orientation shown in FIG. 4. Tension on the actuator 162 in the direction of arrow 326 in FIG. 4 applies a force to the cam 154 which overcomes the biasing force of the cam—biasing spring 224 when the stroller frame 20 is in the deployed position. This places the cam 154 in the first operating position. When the actuator 162 becomes loose, there is no longer a force in the direction of arrow 326, as such the downward biasing force of the cam—biasing spring 224 biases the cam 154 in the downward direction parallel with the vertical axis 166. This results in the sloped cam surface 168 contacting the cam follower 152, which moves the cam follower 152 along the sloped cam surface 168 from the lowest location 210 (FIG. 4) to the uppermost location 212 (FIG. 5). This rotates the vertical axle 150 about the vertical axis 166, which swivels the front left wheel 46 about the vertical axis 166.

As mentioned above, the right swivel mechanism 36 operates in a similar manner to the left swivel mechanism 44. As such, when the stroller frame 20 is moved between the deployed and collapsed position, the front wheels 38, 46 can swivel to provide a more compact collapsed configuration. In the illustrated embodiment, the rear wheels 54, 56 do not swivel about a vertical axis; however, a similar swivel mechanism could be employed in a stroller having rear wheels that swivel. As such, the above disclosure should not be limited to only front wheels that swivel.

A collapsible stroller and a swivel mechanism have been described above with particularity. Directional terms, such as, top, bottom, left, right, up, down, over, above, below, beneath, rear, and front are used with respect to the accompanying drawings. Such directional terms should not be construed to limit the scope of the invention in any manner. Modifications and alterations will occur to those upon reading and understanding the preceding detailed description. The invention, however, is not limited to only the embodiments described above. Instead, the invention is broadly defined by the appended claims and the equivalents thereof. Also various presently unforeseen or unanticipated alternatives, modifications, variations or improvements therein may be subsequently made by those skilled in the art which are also intended to be encompassed by the following claims.

The invention claimed is:

1. A collapsible stroller comprising:
    a stroller frame movable between a deployed position and a collapsed position;
    a wheel; and
    a swivel mechanism connecting the wheel to the stroller frame, the swivel mechanism including
        a vertical axle connected with the wheel for rotation with the wheel and rotatable with respect to the stroller frame about a vertical axis;
        a cam follower, wherein rotation of the cam follower about the vertical axis results in rotation of the vertical axle about the vertical axis; and
        a cam including a sloped cam surface at least partially surrounding the vertical axle, wherein the sloped cam surface contacts the cam follower to move the cam follower along the sloped cam surface, which results in rotation of the cam follower about the vertical axis.

2. The stroller of claim 1, wherein the swivel mechanism further includes an actuator for controlling movement of the cam, a pulling slider and a driving slider for pulling the actuator tight, the actuator being connected to the pulling slider, the driving slider being configured to drive the pulling slider to pull the actuator tight as the stroller frame is moved from the collapsed position toward the deployed position.

3. The stroller of claim 1, wherein the sloped cam surface has an uppermost location and a lowest location, the cam follower is located below the uppermost location when the stroller frame is in the deployed position.

4. The stroller of claim 3 wherein the cam follower is located below the lowest location when the stroller frame is in the deployed position.

5. The stroller of claim 3 wherein the cam follower is in contact with the lowest location when the stroller frame is in the deployed position.

6. The stroller of claim 1, wherein the cam moves with respect to the vertical axle between a first operating position when the stroller frame is in the deployed position and a second operating position when the stroller frame is in the collapsed position.

7. The stroller of claim 1, wherein the swivel mechanism is configured such that when the stroller frame is moved between the deployed position and the collapsed position, the wheel swivels.

8. The stroller of claim 1, wherein the cam follower is fastened to the vertical axle.

* * * * *